United States Patent
Kim et al.

(10) Patent No.: US 12,062,491 B2
(45) Date of Patent: Aug. 13, 2024

(54) MULTILAYER CAPACITOR AND BOARD HAVING THE SAME MOUNTED THEREON

(71) Applicant: SAMSUNG ELECTRO-MECHANICS CO., LTD., Suwon-si (KR)

(72) Inventors: Hyung Joon Kim, Suwon-si (KR); Hyun Ju Kim, Suwon-si (KR); Kyoung Ae Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/238,989

(22) Filed: Aug. 28, 2023

(65) Prior Publication Data

US 2023/0411073 A1 Dec. 21, 2023

Related U.S. Application Data

(63) Continuation of application No. 17/332,608, filed on May 27, 2021, now Pat. No. 11,776,743.

(30) Foreign Application Priority Data

Nov. 12, 2020 (KR) .......................... 10-2020-0150593

(51) Int. Cl.
  *H01G 4/005* (2006.01)
  *H01G 2/06* (2006.01)
  *H01G 4/30* (2006.01)

(52) U.S. Cl.
  CPC ............. *H01G 4/005* (2013.01); *H01G 2/065* (2013.01); *H01G 4/30* (2013.01)

(58) Field of Classification Search
  CPC ........... H01G 4/005; H01G 2/065; H01G 4/30
  (Continued)

(56) References Cited

U.S. PATENT DOCUMENTS

| | | | | |
|---|---|---|---|---|
| 4,852,227 | A * | 8/1989 | Burks | ...................... H01G 4/30 29/25.42 |
| 6,266,229 | B1 * | 7/2001 | Naito | ...................... H01G 4/30 361/308.1 |

(Continued)

FOREIGN PATENT DOCUMENTS

| KR | 10-2009-0037099 A | 4/2009 |
|---|---|---|
| KR | 10-1141457 B1 | 5/2012 |

OTHER PUBLICATIONS

Notice of Allowance issued in corresponding U.S. Appl. No. 17/332,608 dated Jun. 5, 2023.

(Continued)

*Primary Examiner* — Timothy J Thompson
*Assistant Examiner* — Michael F McAllister
(74) *Attorney, Agent, or Firm* — MORGAN, LEWIS & BOCKIUS LLP

(57) ABSTRACT

A multilayer capacitor includes a capacitor body including a dielectric layer and first and second internal electrodes and having first and second surfaces opposing each other, third and fourth surfaces connected to the first and second surfaces and opposing each other, and fifth and sixth surfaces connected to the first and second surfaces, connected to the third and fourth surfaces, and opposing each other, first and second side portions disposed on the fifth and sixth surfaces of the capacitor body, respectively, and first and second external electrodes disposed on the third and fourth surfaces of the capacitor body, respectively, and connected to the first and second internal electrodes, respectively. The first and second internal electrodes have protrusions at one-side edge in a direction perpendicular to the fifth and sixth surfaces of the capacitor body.

8 Claims, 6 Drawing Sheets

(58) Field of Classification Search
USPC .......................................................... 174/260
See application file for complete search history.

(56) References Cited

U.S. PATENT DOCUMENTS

| | | | |
|---|---|---|---|
| 9,706,641 B1* | 7/2017 | Park | H01G 4/232 |
| 2004/0190221 A1 | 9/2004 | Yamaguchi | |
| 2009/0284897 A1* | 11/2009 | Itamura | H01G 4/232 |
| | | | 29/25.42 |
| 2010/0182760 A1* | 7/2010 | Chikamichi | H01L 23/50 |
| | | | 361/782 |
| 2011/0102971 A1 | 5/2011 | Itamura | |
| 2011/0273815 A1* | 11/2011 | Kobayashi | H01G 4/232 |
| | | | 361/306.3 |
| 2012/0147516 A1 | 6/2012 | Kim et al. | |
| 2016/0126013 A1* | 5/2016 | Park | H01G 4/232 |
| | | | 361/301.4 |

OTHER PUBLICATIONS

Office Action issued in corresponding U.S. Appl. No. 17/332,608 dated Feb. 9, 2023.

* cited by examiner

I - I'

MULTILAYER CAPACITOR AND BOARD HAVING THE SAME MOUNTED THEREON

CROSS-REFERENCE TO RELATED APPLICATION(S)

This application is the continuation application of U.S. patent application Ser. No. 17/332,608 filed on May 27, 2021, which claims benefit under 35 USC 119(a) of Korean Patent Application No. 10-2020-0150593 filed on Nov. 12, 2020 in the Korean Intellectual Property Office, the entire disclosures of which are incorporated herein by reference for all purposes.

TECHNICAL FIELD

The present disclosure relates to a multilayer capacitor and a board having the same mounted thereon.

BACKGROUND

Multilayer capacitors are widely used as components in IT devices such as computers, personal digital assistants (PDA), and mobile phones due to advantages thereof such as small size, high capacity and ease of mounting, and have high reliability and high strength characteristics, to be widely used as electric and electronic components.

With the recent miniaturization and multifunctionalization of electronic devices, multilayer capacitors have also been required to have a small size and high capacity. Therefore, a multilayer capacitor having a structure, in which the area of an internal electrode is significantly reduced in the width direction by attaching a side portion after exposing the internal electrode in the width direction of a capacitor body, has been manufactured.

In manufacturing the multilayer capacitor having such a structure, a capacitor body is manufactured by stacking and cutting a plurality of dielectric layers, and then, side portions are separately attached to both sides of the capacitor body in the width direction before sintering, such that the side portions cover the exposed portions of internal electrodes, thereby reducing a High Voltage Shock (HVS) defect and an Insulation Resistance (IR) defect.

However, in the multilayer capacitor having such a structure, there is a problem in that interlayer short defects increase due to burrs generated in the process of cutting a laminate for each capacitor body. These interlayer shorts may be a direct cause of HVS defects.

SUMMARY

Exemplary embodiments provide a multilayer capacitor and a board having the same mounted thereon, in which the capacity of a capacitor may increase by expanding the area of an internal electrode, the occurrence of burrs may be reduced when cutting a laminate for each capacitor body during a manufacturing process, and defects such as interlayer shorts even by burrs may be prevented.

According to an aspect of the present disclosure, a multilayer capacitor includes a capacitor body including a dielectric layer and first and second internal electrodes, the capacitor body including first and second surfaces opposing each other, third and fourth surfaces connected to the first and second surfaces and opposing each other, and fifth and sixth surfaces connected to the first and second surfaces, connected to the third and fourth surfaces, and opposing each other in a width direction of the capacitor body; first and second side portions disposed on the fifth and sixth surfaces of the capacitor body, respectively; and first and second external electrodes disposed on the third and fourth surfaces of the capacitor body, respectively, and connected to the first and second internal electrodes, respectively. The first and second internal electrodes have protrusions at one of edges opposing each other in the width direction.

The protrusions of the first and second internal electrodes may be in contact with one of the first and second side portions.

The protrusions of the first internal electrode and the protrusions of the second internal electrode may alternate with each other in a direction in which the first and second internal electrodes are stacked.

The protrusions of first internal electrode contact one of the first and second side portions, and the protrusions of the second internal electrode contact the one of the first and second side portions.

The protrusions of the first internal electrode may have a predetermined interval therebetween, and the protrusions of the second internal electrode may have a predetermined interval therebetween.

The first internal electrode may include first grooves spaced apart from the fifth and sixth surfaces of the capacitor body, and the second internal electrode may include third grooves spaced apart from the fifth and sixth surfaces of the capacitor body.

The multilayer capacitor may further include first dummy patterns respectively disposed in the first grooves to be spaced apart from the first internal electrode, and third dummy patterns respectively disposed in the third grooves to be spaced apart from the second internal electrode.

The first patterns may be in contact with one of the first and second side portions, and the third dummy patterns may be in contact with the one of the first and second side portions.

One of the first grooves may be disposed in a portion of the first internal electrode connecting the third and fifth surfaces of the capacitor body, and one of the third grooves may be disposed in a portion of the second internal electrode connecting the fourth and fifth surfaces of the capacitor body.

The first grooves may have a predetermined interval therebetween, and the third grooves may have a predetermined interval therebetween.

The first internal electrode may have a first cutout disposed a corner adjacent to the fourth surface of the capacitor, and the second internal electrode may have a second cutout disposed at a corner adjacent to the third surface of the capacitor.

The capacitor body may include an active region in which the first and second internal electrodes overlap, and upper and lower cover regions disposed on upper and lower surfaces of the active region, respectively.

The first and second external electrodes may include, respectively, first and second connecting portions disposed on the third and fourth surfaces of the capacitor body, respectively, and connected to the first and second internal electrodes, respectively; and first and second band portions extending from the first and second connecting portions to a portion of the first surface of the capacitor body, respectively.

The first and second internal electrodes may have protrusions at the other of edges opposing each other in the width direction.

According to an aspect of the present disclosure, a board having a multilayer capacitor mounted thereon, includes a substrate having first and second electrode pads on one surface; and the multilayer capacitor mounted in such a manner that first and second external electrodes are connected to the first and second electrode pads, respectively.

According to an aspect of the present disclosure, a multilayer capacitor includes a capacitor body including a dielectric layer and first and second internal electrodes; and first and second external electrodes respectively disposed on surfaces of the capacitor body opposing each other in a length direction of the capacitor body, and respectively connected to the first and second internal electrodes. An edge of one of the first and second internal electrodes may have protrusions and grooves disposed in the length direction, and the protrusions and grooves may be spaced apart from the first and second external electrodes.

The multilayer capacitor may further include a side portion disposed on the capacitor body to contact the edge of the one of the first and second internal electrodes.

The protrusions and grooves may be alternately disposed along the edge.

The multilayer capacitor may further include dummy patterns respectively disposed in the grooves to be spaced apart from the one of the first and second internal electrodes.

The multilayer capacitor may further include a side portion disposed on the capacitor body to contact the edge of the one of the first and second internal electrodes; and dummy patterns respectively disposed in the grooves to be spaced apart from the one of the first and second internal electrodes and contacting the side portion.

A width, in the length direction, of one of the grooves may be greater than a width, in the length direction, of one of the protrusions.

An end of the edge of the one of the first and second internal electrodes may be provided with a groove or a cutout recessed from a corner of the one of the first and second internal electrodes.

According to an aspect of the present disclosure, a multilayer capacitor include a capacitor body including first and second internal electrodes and a dielectric layer disposed therebetween; and first and second external electrodes respectively disposed on surfaces of the capacitor body opposing each other in a length direction of the capacitor body, and respectively connected to the first and second internal electrodes. One of the first internal electrodes and one of the second internal electrodes each have an edge provided with protrusions and grooves disposed in the length direction.

The protrusions and grooves may be alternately disposed along the length direction.

The multilayer capacitor may further include: first dummy patterns respectively disposed in the grooves of the one of the first internal electrodes to be spaced apart from the one of the first internal electrodes; and third dummy patterns respectively disposed in the grooves of the one of the second internal electrodes to be spaced apart from the one of the second internal electrodes.

Protrusions of the one of the first internal electrodes may respectively overlap with the grooves of the one of the second internal electrodes in a stacking direction of the first and second internal electrodes, and the grooves of the one of the first internal electrodes may respectively overlap with the protrusions of the one of the second internal electrodes in the stacking direction of the first and second internal electrodes.

A width, in the length direction, of one of the grooves of the one of the first internal electrodes may be greater than a width in, the length direction, of one of the protrusions of the one of the second internal electrodes which overlaps with the one of the grooves of the one of the first internal electrodes in a stacking direction of the first and second internal electrodes. A width, in the length direction, of one of the grooves of the one of the second internal electrodes may be greater than a width, in the length direction, of one of the protrusions of the one of the first internal electrodes which overlaps with the one of the grooves of the one of the second internal electrodes in the stacking direction of the first and second internal electrodes.

An end of the edge of the one of the first internal electrodes may be provided with a groove and an end of the edge of the one of the second internal electrodes is provided with a cutout, and the groove at the end of the edge of the one of the first internal electrodes and the cutout at the end of the edge of the one of the second internal electrodes may overlap with each other in a stacking direction of the first and second internal electrodes.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
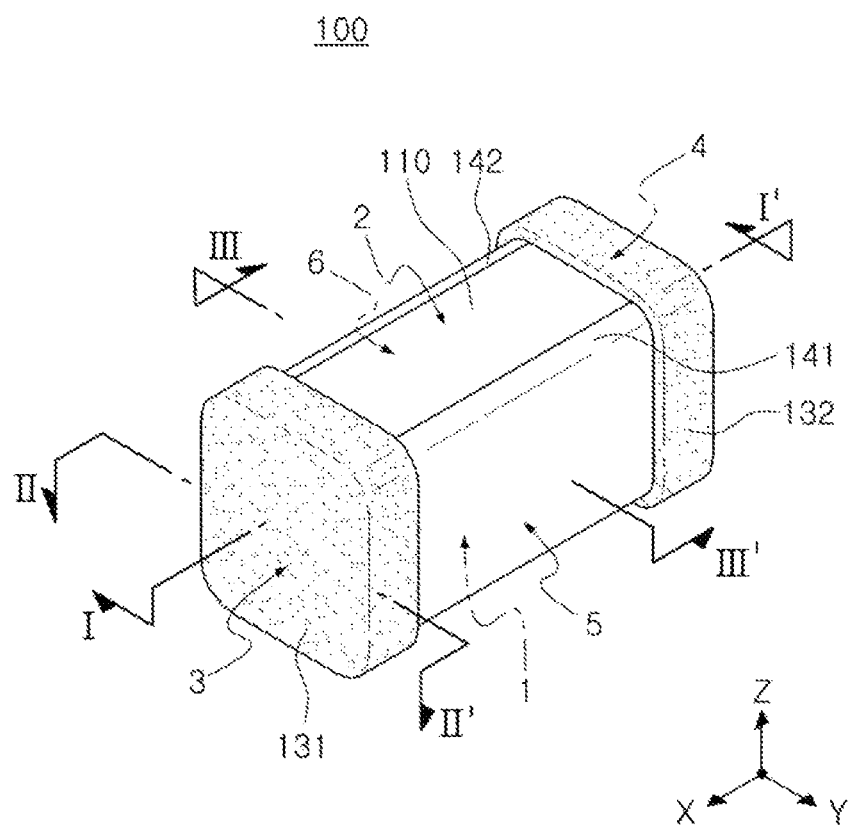
FIG. 1 is a perspective view illustrating a multilayer capacitor according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

When directions are defined to clearly describe an exemplary embodiment, X, Y, and Z illustrated in the drawings represent the length direction, width direction, and thickness direction of the multilayer capacitor, respectively.

In addition, in the embodiment, the Z direction may be used in the same concept as the stacking direction in which the dielectric layers are stacked.

Figure 2:
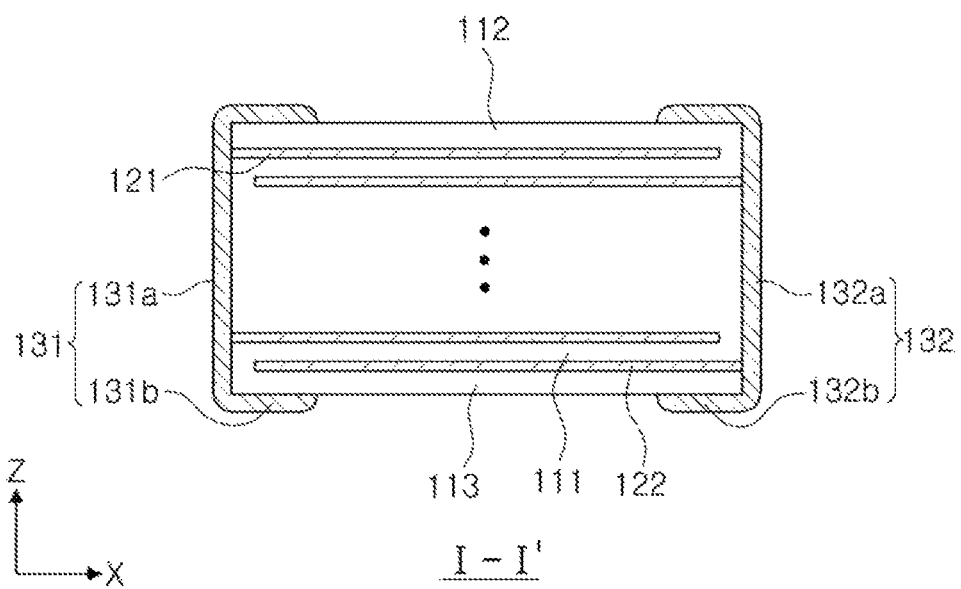
FIG. 2 is a cross-sectional view taken along line I-I' of FIG. 1.
Figure 3A:
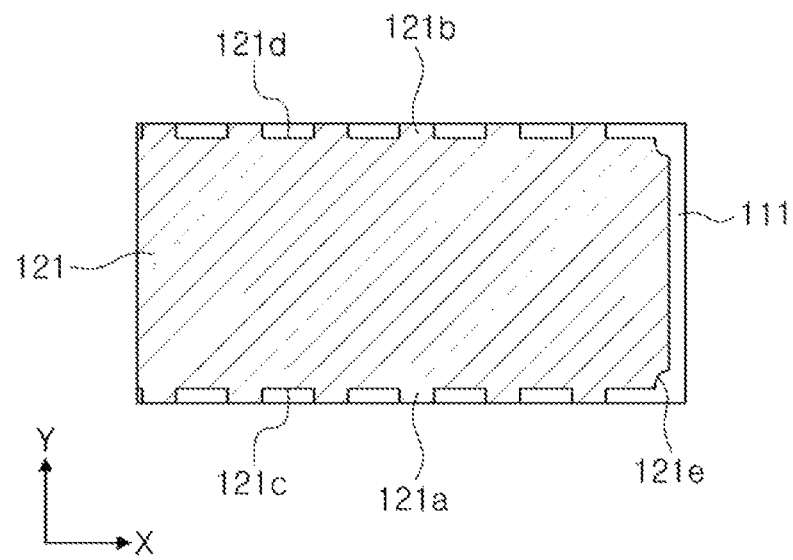
FIGS. 3A and 3B are plan views illustrating first and second internal electrodes of the multilayer capacitor of FIG. 1.
Figure 3B:
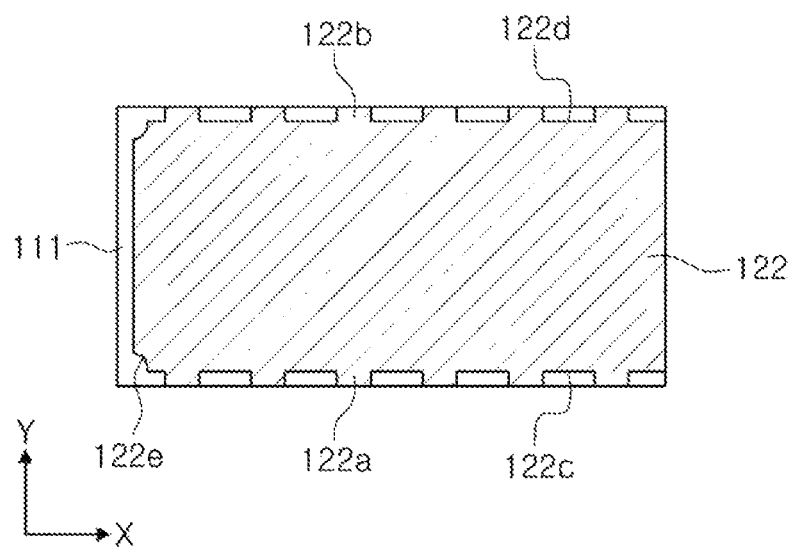
Figure 4:
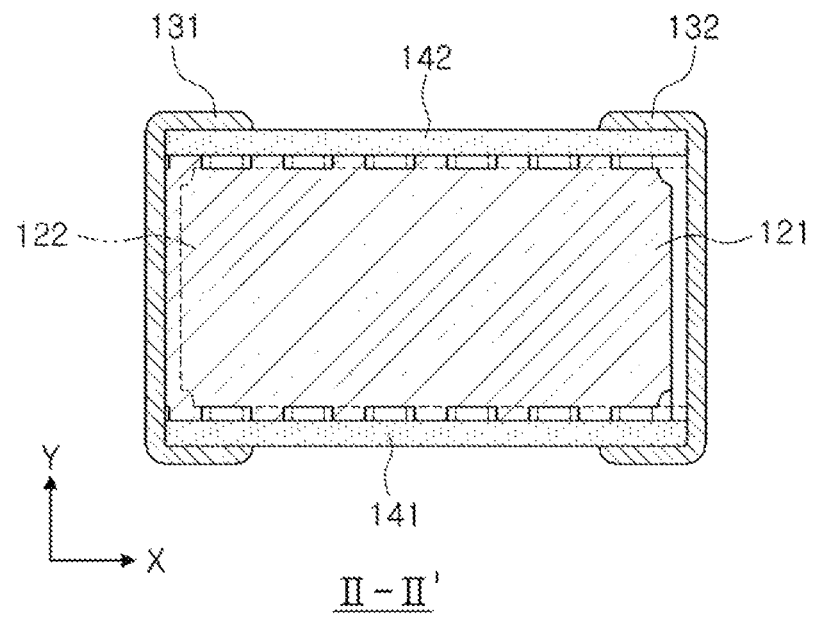
FIG. 4 is a cross-sectional view taken along line II-II' of FIG. 1.
Figure 5:
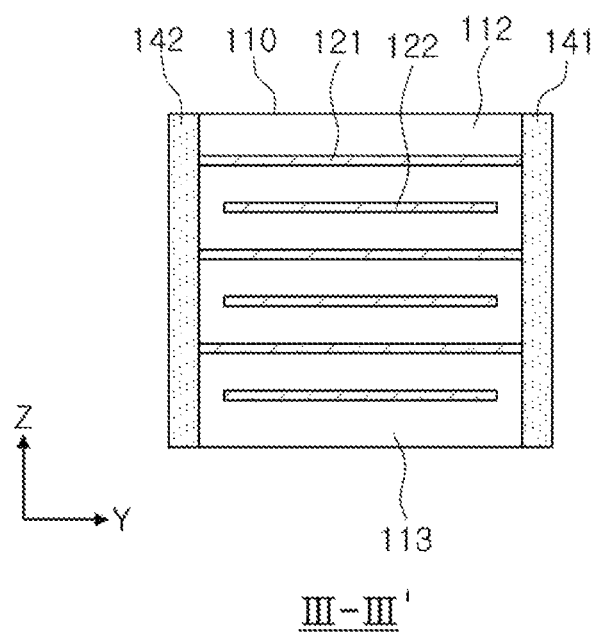
FIG. 5 is a cross-sectional view taken along line III-III' of FIG. 1.

FIG. 1 is a perspective view illustrating a multilayer capacitor according to an example embodiment, FIG. 2 is a cross-sectional view taken along line I-I' of FIG. 1, FIGS. 3A and 3B are plan views illustrating first and second internal electrodes of the multilayer capacitor of FIG. 1, FIG. 4 is a cross-sectional view taken along line II-II' of FIG. 1, and FIG. 5 is a cross-sectional view taken along line III-III' of FIG. 1.

Hereinafter, with reference to FIGS. 1 to 5, a multilayer capacitor 100 according to an exemplary embodiment will be described.

Referring to FIGS. 1 to 5, the multilayer capacitor 100 according to an exemplary embodiment includes a capacitor body 110, first and second side portions 141 and 142, and first and second external electrodes 131 and 132.

The capacitor body 110 is obtained by stacking and sintering a plurality of dielectric layers 111 in the Z direction. The boundary between the adjacent dielectric layers 111 of the capacitor body 110 may be integrated to such an extent that it is difficult to check without using a scanning electron microscope (SEM).

Further, the capacitor body 110 includes a plurality of dielectric layers 111, as well as first and second internal electrodes 121 and 122 which have different polarities and are alternately disposed in the Z direction with the dielectric layers 111 interposed therebetween.

In addition, the capacitor body 110 may include an active region, which is a portion contributing to the formation of capacitance of the capacitor and in which the first and second internal electrodes 121 and 122 are alternately disposed in the Z direction with the dielectric layer 111 interposed therebetween, and upper and lower cover regions 112 and 113 provided on upper and lower surfaces of the active region, respectively, in the Z direction, as margin portions.

In addition, the capacitor body 110 is not particularly limited in the shape thereof, but may have a hexahedral shape, and may have first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2, connected to the third and fourth surfaces 3 and 4, and opposing each other. In this case, in this embodiment, the first surface 1 may be a mounting surface of the multilayer capacitor 100.

The dielectric layer 111 may include ceramic powder, for example, $BaTiO_3$-based ceramic powder.

In addition, the $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, in which Ca or Zr is partially dissolved in $BaTiO_3$(BT).

In addition, ceramic additives, organic solvents, plasticizers, binders, dispersants, and the like may be further added to the dielectric layer 111 in addition to the ceramic powder.

The ceramic additive may include, for example, a transition metal oxide or a transition metal carbide, a rare earth element, magnesium (Mg) or aluminum (Al).

The first and second internal electrodes 121 and 122 are electrodes to which different polarities are applied, and are formed on each dielectric layer 111, to be alternately stacked in the Z direction. The first and second internal electrodes 121 and 122 may be alternately disposed inside of the capacitor body 110 with one dielectric layer 111 interposed therebetween, to face each other in the Z direction.

In this case, the first and second internal electrodes 121 and 122 may be electrically insulated from each other by the dielectric layer 111 disposed therebetween.

In addition, the first internal electrode 121 may be exposed through the third, fifth and sixth surfaces 3, 5 and 6 of the capacitor body 110.

In this case, both regions of the first internal electrode 121 in the Y direction, exposed through the fifth and sixth surfaces 5 and 6 of the capacitor body 110, may have an unevenness pattern.

To this end, the first internal electrode 121 may have a plurality of first and second protrusions 121a and 121b at a predetermined interval therebetween at both edges in the Y direction perpendicular to the fifth and sixth surfaces 5 and 6 of the capacitor body 110, respectively.

The first protrusion 121a is exposed through the fifth surface 5 of the capacitor body 110 and is in contact with the first side portion 141, and the second protrusion 121b is exposed to the sixth surface 6 of the capacitor body 110 and is in contact with the second side portion 142.

In addition, the first internal electrode 121 may have a plurality of first and second grooves 121c and 121d, which are formed by the first and second protrusions 121a and 121b, to have a predetermined interval therebetween at both edges in the Y direction perpendicular to the fifth and sixth surfaces 5 and 6 of the capacitor body 110, respectively.

Accordingly, a portion of the edge of one side of the first internal electrode 121 may not be exposed to the fifth surface 5 of the capacitor body 110 by the first groove 121c, and may be spaced apart from the fifth surface 5 of the capacitor body 110, and a portion of the edge of the other side of the first internal electrode 121 may not be exposed to the sixth surface 6 of the capacitor body 110 by the second groove 121d and may be spaced apart from the sixth surface 6 of the capacitor body 110.

In this case, the first groove 121c may also be formed in a portion of the first internal electrode 121 connecting the third and fifth surfaces 3 and 5 of the capacitor body 110, and the second groove 121d may also be formed in a portion of the first internal electrode 121 connecting the third and sixth surfaces 3 and 6 of the capacitor body 110.

Further, the first internal electrode 121 may have first cutouts 121e formed at both corners adjacent to the fourth surface 4 of the capacitor body 110, respectively.

The second internal electrode 122 is exposed through the fourth, fifth and sixth surfaces 4, 5 and 6 of the capacitor body 110.

In this case, both ends of the second internal electrode 122 in the Y direction, exposed through the fifth and sixth surfaces 5 and 6 of the capacitor body 110, may have an unevenness pattern.

To this end, the second internal electrode 122 may have a plurality of third and fourth protrusions 122a and 122b, which are formed at a predetermined interval at both edges in the Y direction perpendicular to the fifth and sixth surfaces 5 and 6 of the capacitor body 110, respectively.

The third protrusion 122a is exposed through the fifth surface 5 of the capacitor body 110 to contact the first side portion 141, and the fourth protrusion 122b is exposed to the sixth surface 6 of the capacitor body 110 to contact the second side portion 142.

In this case, the unevenness pattern of the first internal electrode 121 and the unevenness pattern of the second internal electrode 122 may be formed alternately with each other in the Z direction in which the dielectric layer 111 is stacked.

For example, the third protrusion 122a may be formed in a position corresponding to the first groove 121c of the first internal electrode 121 in the Z direction, and the fourth protrusion 122b may be formed in a position corresponding to the second groove 121d of the first internal electrode 121 in the Z direction.

In addition, the second internal electrode 122 may have a plurality of third and fourth grooves 122c and 122d, which are formed by the third and fourth protrusions 122a and 122b, at a predetermined interval therebetween at both edges in the Y direction perpendicular to the fifth and sixth surfaces 5 and 6 of the capacitor body 110, respectively.

Accordingly, a portion of the edge of one side of the second internal electrode 122 may not be exposed to the fifth surface 5 of the capacitor body 110 by the third groove 122c, and may be spaced apart from the fifth surface 5 of the capacitor body 110, and a portion of the edge of the other side of the second internal electrode 122 may not be exposed to the sixth surface 6 of the capacitor body 110 by the fourth groove 122d and may be spaced apart from the sixth surface 6 of the capacitor body 110.

In this case, the third groove 122c may be formed in a position corresponding to the first protrusion 121a of the first internal electrode 121 in the Z direction, and the fourth groove 122d may be formed in a position corresponding to the second protrusion 121b of the first internal electrode 121 in the Z direction.

In this case, the third groove 122c may also be formed in a portion of the second internal electrode 122, connecting the fourth and fifth surfaces 4 and 5 of the capacitor body 110, and the fourth groove 122d may also be formed in a portion of the second internal electrode 122, connecting the fourth and sixth surfaces 4 and 6 of the capacitor body 110.

In addition, the second internal electrode 122 may have second cutouts 122e formed at both corners adjacent to the third surface 3 of the capacitor body 110, respectively.

In this case, ends of the first and second internal electrodes 121 and 122 alternately exposed through the third and fourth surfaces 3 and 4 of the capacitor body 110 may be connected to first and second external electrodes 131 and 132 disposed on both ends of the capacitor body 110 in the X direction, to be described later, respectively.

According to the above configuration, when a predetermined voltage is applied to the first and second external electrodes 131 and 132, electric charges are accumulated between the first and second internal electrodes 121 and 122.

In this case, the capacitance of the multilayer capacitor 100 is proportional to the overlapping area of the first and second internal electrodes 121 and 122 overlapping each other in the Z direction in the active region.

As in this embodiment, when the first and second internal electrodes 121 and 122 are configured, not only the basic areas of the first and second internal electrodes 121 and 122 are expanded, but the vertically-overlapping area is also increased. Therefore, the capacity of the multilayer capacitor 100 may be increased.

For example, when the area of the overlapping region of the first and second internal electrodes 121 and 122 is significantly increased, the capacitance may also be significantly increased even for a capacitor of the same size.

In addition, the acceleration life of the insulation resistance may be improved by reducing the step difference due to the stacking of the internal electrodes, and thus, the multilayer capacitor 100 having excellent capacity characteristics and improved reliability may be provided.

In this case, the material for forming the first and second internal electrodes 121 and 122 is not particularly limited, and the first and second internal electrodes 121 and 122 may be formed using a noble metal material or a conductive paste formed of at least one of nickel (Ni) and copper (Cu).

The printing method of the conductive paste may be a screen printing method or a gravure printing method, and is not limited thereto.

The first side portion 141 is disposed on the fifth surface 5 of the capacitor body 110, and the second side portion 142 is disposed on the sixth surface 6 of the capacitor body 110.

The first and second side portions 141 and 142 are in contact to cover the front ends of portions of the first and second internal electrodes 121 and 122, exposed through the fifth and sixth surfaces 5 and 6 of the capacitor body 110, respectively.

For example, in this embodiment, the first side portion 141 is in contact with the first protrusion 121a of the first internal electrode 121 and the third protrusion 122a of the second internal electrode 122, and the second side portion 142 is in contact with the second protrusion 121b of the first internal electrode 121 and the fourth protrusion 122b of the second internal electrode 122.

These first and second side portions 141 and 142 may serve to protect the capacitor body 110 and the first and second internal electrodes 121 and 122 from external shocks, or the like, and to secure insulation and moisture resistance around the capacitor body 110.

The first and second external electrodes 131 and 132 are provided with voltages of different polarities, are disposed on both ends of the capacitor body 110 in the X direction, and are connected to portions of the first and second internal electrodes 121 and 122, exposed through the third and fourth surfaces 3 and 4 of the capacitor body 110, respectively.

The first external electrode 131 may include a first connecting portion 131a and a first band portion 131b.

The first connecting portion 131a is disposed on the third surface 3 of the capacitor body 110 and contacts an end of the first internal electrode 121, exposed externally through the third surface 3 of the capacitor body 110, to serve to physically and electrically connect the first internal electrode 121 and the first external electrode 131 to each other.

The first band portion 131b is a portion extending from the first connecting portion 131a to a portion of the first surface 1 of the capacitor body 110.

In this case, the first band portion 131b is further extended toward the second, fifth and sixth surfaces 2, 5 and 6 of the capacitor body 110 to improve the adhesion strength, or the like, if necessary, to cover one ends of the first and second side portions 141 and 142.

The second external electrode 132 may include a second connecting portion 132a and a second band portion 132b.

The second connecting portion 132a is disposed on the fourth surface 4 of the capacitor body 110 and contacts an end of the second internal electrode 122, exposed externally through the fourth surface 4 of the capacitor body 110, to physically and electrically connect the second internal electrode 122 and the second external electrode 132 to each other.

The second band portion 132b is a portion extending from the second connecting portion 132a to a portion of the first surface 1 of the capacitor body 110.

In this case, the second band portion 132b is further extended toward the second, fifth and sixth surfaces 2, 5 and 6 of the capacitor body 110 to improve the adhesion strength, or the like, if necessary, to cover the other ends of the first and second side portions 141 and 142.

In addition, the first and second external electrodes 131 and 132 may each include a plating layer for at least some of structural reliability, board mounting ease, external durability, heat resistance, and equivalent series resistance (ESR).

For example, the plating layer may be formed by sputtering or electrolytic plating, but the forming method is not limited thereto.

In addition, the plating layer may include a relatively largest amount of nickel, but the configuration is not limited thereto, and may be implemented with copper (Cu), palladium (Pd), platinum (Pt), gold (Au), silver (Ag) or lead (Pb) alone, or at least one or more alloys thereof.

In general, multilayer capacitors are manufactured in the order of designing a margin between adjacent chips and chips, printing internal electrodes, stacking the internal electrodes, and then cutting the resultant product into individual chips.

On the other hand, the related art multilayer capacitor of the no-margin structure is manufactured by designing, printing and stacking the internal electrodes without margin, and then cutting into individual chips so that the internal electrodes are exposed in the width direction, and then attaching side portions to both sides of a laminate in the width direction, to which the internal electrodes are exposed.

In the case of a general multilayer capacitor with the above margin, there is a problem in which HVS and IR are deteriorated, and in the case of the related art non-margin multilayer capacitor, there is a problem in which a burr occurs on the exposed surface of the laminate during the process of printing and stacking internal electrodes without a margin, and then cutting into respective chips using a blade.

These burs make the gap between the vertically adjacent electrodes narrow, thereby causing a problem that HVS is lowered or a short circuit occurs.

According to an exemplary embodiment of the present disclosure, the first and second internal electrodes 121 and 122 have unevenness patterns at both edges in the width direction, respectively.

Accordingly, some of the edges of both sides of the first and second internal electrodes 121 and 122 in the Y direction are exposed through the fifth and sixth surfaces 5 and 6 of the capacitor body 110 during the manufacturing process, and thus, the step at the edge of the capacitor body 110 is reduced.

Accordingly, in the process of manufacturing the multilayer capacitor 100, when the laminate is compressed, the edge portion of the capacitor body 110 is prevented from being stretched or warped, thereby improving product reliability.

In addition, the unevenness pattern of the first internal electrode 121 and the unevenness pattern of the second internal electrode 122 may be formed to alternate with each other when the convex portion and the concave portion of the first and second internal electrodes 121 and 122 overlap in the Z direction.

In this case, the convex portions may be portions respectively exposed through the fifth and sixth surfaces 5 and 6 of the capacitor body 110 when manufacturing the capacitor, and the concave portions may be portions spaced apart from the fifth and fifth surfaces 5 and 6 of the capacitor body 110.

According to this configuration, when the laminate is pressed and then cut into individual chips using a blade, not only less burrs occur compared to the related art multilayer capacitors of no-margin structure, and even in a case in which burrs are generated, since a phenomenon in which the first and second internal electrodes 121 and 122 located vertically are electrically connected to each other may be reduced or prevented, a short circuit defect of the multilayer capacitor 100 may be reduced, and a decrease in HVS may be prevented.

In one example, the first protrusions 121a and the first grooves 121c of the first internal electrode 121 may be alternately disposed in the X direction, the second protrusions 121b and the second grooves 121d of the first internal electrode 121 may be alternately disposed in the X direction, the third protrusions 122a and the third grooves 122c of the second internal electrode 122 may be alternately disposed in the X direction, and the fourth protrusions 122b and the fourth grooves 122d of the second internal electrode 122 may be alternately disposed in the X direction. In this case, in an overlay view or a superimposed view of one first internal electrode 121 and one second internal electrode 122 adjacent to each other or in a cross-sectional view of one first internal electrode 121 and one second internal electrode 122 adjacent to each other, the first protrusions 121a and the third protrusions 122a may be disposed in a staggered manner, or be disposed alternately, in the X direction, the second protrusions 121b and the fourth protrusions 122b may be disposed in a staggered manner, or be disposed alternately, in the X direction, the first grooves 121c and the third grooves 122c may be disposed in a staggered manner, or be disposed alternately, in the X direction, and the second grooves 121d and the fourth grooves 122d may be disposed in a staggered manner, or be disposed alternately, in the X direction.

In one example, a width in the X direction of the first groove 121c may be greater than a width in the X direction of the first protrusion 121a, a width in the X direction of the second groove 121d may be greater than a width in the X direction of the second protrusion 121b, a width in the X direction of the third groove 122c may be greater than a width in the X direction of the third protrusion 122a, a width in the X direction of the fourth groove 122d may be greater than a width in the X direction of the fourth protrusion 122b. In one example, in an overlay view or a superimposed view of one first internal electrode 121 and one second internal electrode 122 adjacent to each other or in a cross-sectional view of one first internal electrode 121 and one second internal electrode 122 adjacent to each other, the first protrusion 121a may overlap with the third groove 122c and may be spaced apart from one or both of edges of the third groove 122c opposing each other in the X direction, the second protrusion 121b may overlap with the fourth groove 122d and may be spaced apart from one or both edges of the fourth groove 121d opposing each other in the X direction, the third protrusion 122a may overlap with the first groove 121c and may be spaced apart from one or both edges of the first groove 121c opposing each other in the X direction, and the fourth protrusion 122b may overlap with the second groove 121d and may be spaced apart from one or both edges of the second groove 121d opposing each other in the X direction.

In one example, the first grooves 121c, the second grooves 121d, the third grooves 122c, and the fourth grooves 122d may be filled with a dielectric material of the dielectric layers 111.

The shapes or the structures of the first protrusions 121a, the second protrusions 121b, the third protrusions 122a, and the fourth protrusions 122b, and the shapes or the structures of the first grooves 121c, the second grooves 121d, the third grooves 122c, and the fourth grooves 122d may not be limited to a square shape or a rectangular shape as examples shown in the drawings and described above. Other shapes, such as a triangular shape, a trapezoid shape, and the like, may also be used.

Figure 6A:
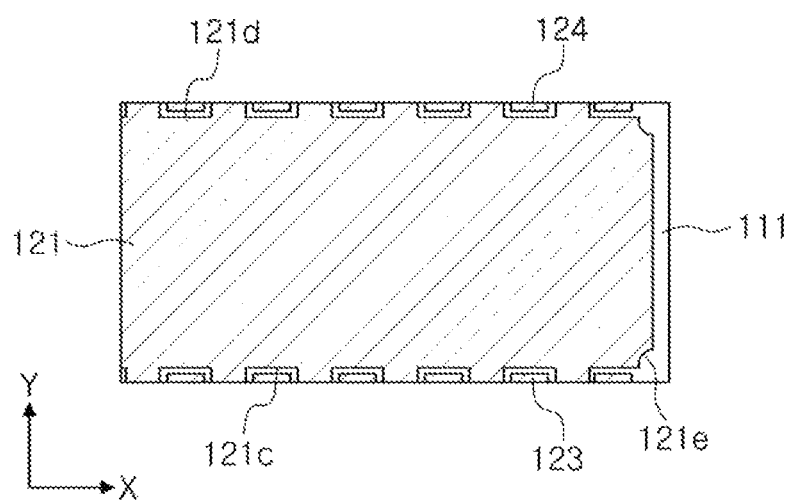
FIGS. 6A and 6B are plan views illustrating another embodiment of first and second internal electrodes.
Figure 6B:
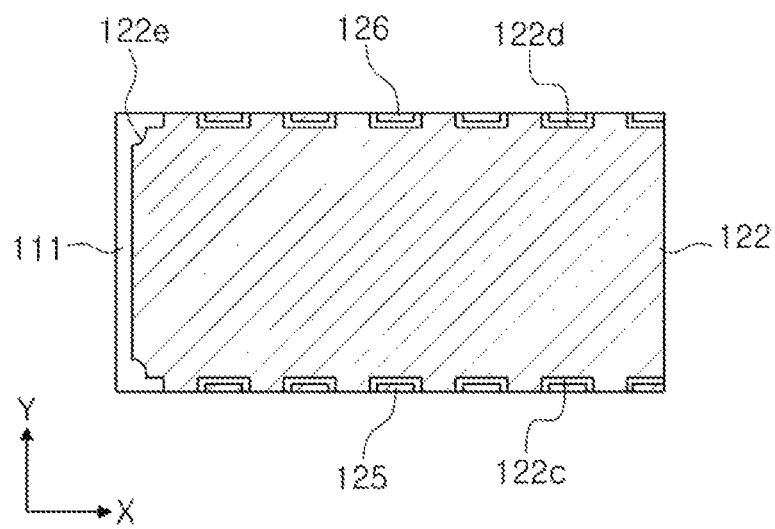
Figure 7:
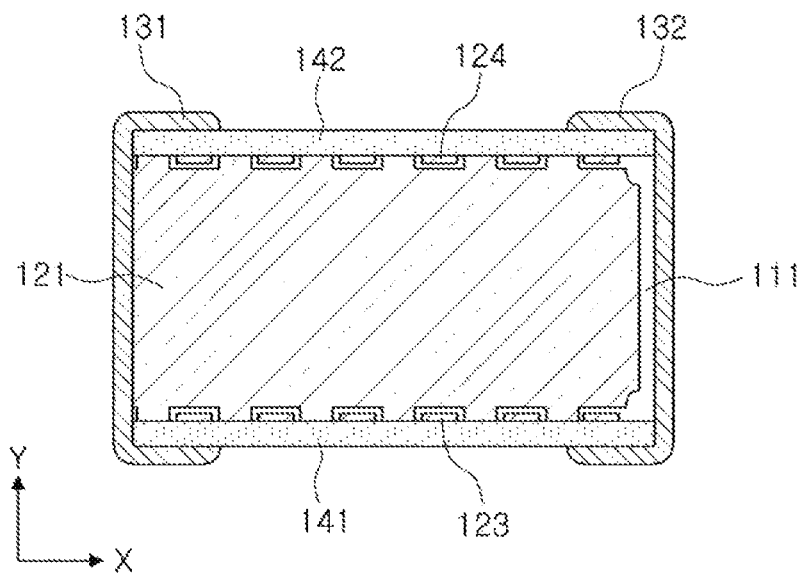
FIG. 7 is an X-Y cross-sectional view of a multilayer capacitor to which the first internal electrode of FIG. 6A is applied.
Figure 8:
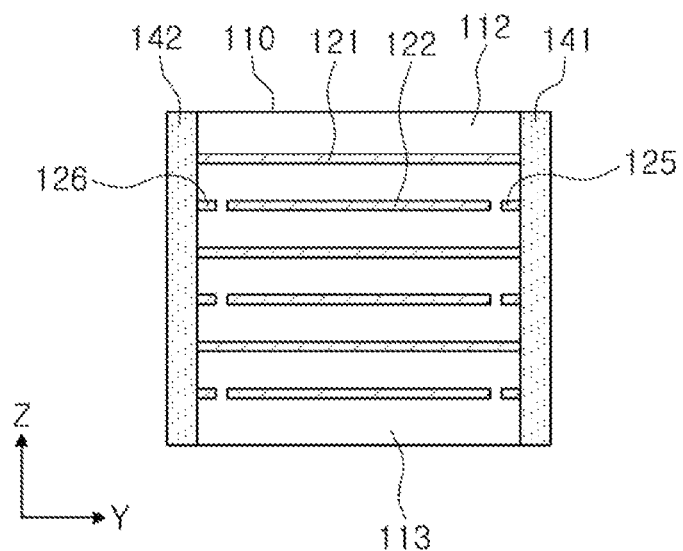
FIG. 8 is a Y-Z cross-sectional view of a multilayer capacitor to which first and second internal electrodes of FIGS. 6A and 6B are applied.

FIGS. 6A and 6B are plan views showing another embodiment of the first and second internal electrodes in the present disclosure, and FIG. 7 is an X-Y cross-sectional view of a multilayer capacitor to which the first internal electrode of FIG. 6A is applied, and FIG. 8 is a Y-Z cross-sectional view of a multilayer capacitor to which the first and second internal electrodes of FIGS. 6A and 6B are applied.

Referring to FIGS. 6A to 8, on a dielectric layer 111 on which the first internal electrode 121 is formed, a first dummy pattern 123 may be disposed in a first groove 121c, to be spaced apart from the edge of the first internal electrode 121, and a second dummy pattern 124 may be disposed in a second groove 121d, to be spaced apart from the edge of the first internal electrode 121.

In this case, the first dummy pattern 123 may be exposed through the fifth surface 5 of the capacitor body 110 and may contact a first side portion 141, and the second dummy pattern 124 may be exposed through the sixth surface 6 of the capacitor body 110 and may contact a second side portion 142.

In addition, on the dielectric layer 111 on which the second internal electrode 122 is formed, a third dummy pattern 125 may be disposed in a third groove 122c to be spaced apart from the edge of the second internal electrode 122, and a fourth dummy pattern 126 may be disposed in a fourth groove 122d to be spaced apart from the edge of the second internal electrode 122.

In this case, the third dummy pattern 125 may be exposed through the fifth surface 5 of the capacitor body 110 to contact the first side portion 141, and the fourth dummy pattern 126 may be exposed through the sixth surface 6 the capacitor body 110 to contact the second side portion 142.

According to this structure, the step difference at the edge of the capacitor body 110 may be further reduced, and in the process of manufacturing the multilayer capacitor 100, the edge of the capacitor body 110 may be further suppressed from being stretched or bending when the laminate is pressed. Therefore, the product reliability may be further improved.

In addition, when the first and third dummy patterns 123 and 125 are exposed through the fifth surface 5 of the capacitor body 110, and the second and fourth dummy patterns 124 and 126 are exposed through the sixth surface 6 of the capacitor body 110, and when the internal electrodes are stacked and then cut into respective capacitor bodies, the phenomenon in which the internal electrodes collapse toward the edge may be more effectively prevented.

The other details are substantially the same as described above, and the overlapping detailed description thereof are omitted.

Figure 9:
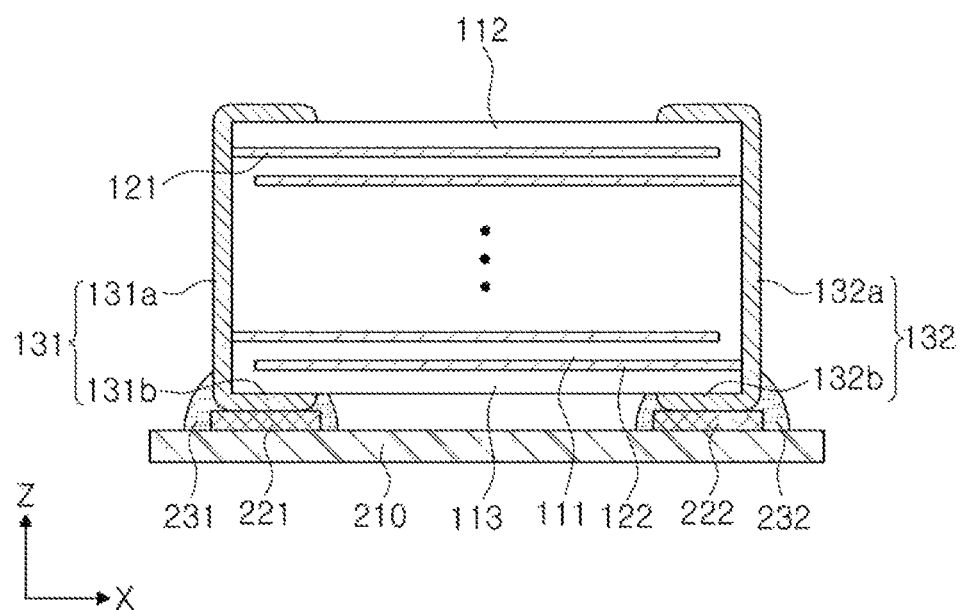
FIG. 9 is a schematic cross-sectional view of a substrate on which the multilayer capacitor of FIG. 1 is mounted.

FIG. 9 is a schematic cross-sectional view of a board on which the multilayer capacitor of FIG. 1 is mounted.

Referring to FIG. 9, a board on which the multilayer capacitor according to the present embodiment is mounted may include a substrate 210 having first and second electrode pads 221 and 222 on one surface thereof, and a multilayer capacitor 100 mounted in such a manner that the first and second external electrodes 131 and 132 are connected to upper portions of the first and second electrode pads 221 and 222, respectively, on the upper surface of the substrate 210.

In this embodiment, the multilayer capacitor 100 is illustrated and described as being mounted on the substrate 210 by solders 231 and 232, but a conductive paste may be used instead of solder if necessary.

As set forth above, according to exemplary embodiments, the capacity of a multilayer capacitor may increase as the area of an internal electrode expands, the occurrence of burrs may be reduced when a laminate is cut into capacitor bodies during a manufacturing process as both edges of the internal electrode have an uneven shape, and short defects due to the burrs may be prevented.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer capacitor comprising:
a capacitor body including a dielectric layer and first and second internal electrodes; and
first and second external electrodes respectively disposed on surfaces of the capacitor body opposing each other in a length direction of the capacitor body, and respectively connected to the first and second internal electrodes,
wherein one of the first and second internal electrodes has a plurality of grooves formed at edge thereof, respectively.

2. The multilayer capacitor of claim 1, further comprising a side portion disposed on the capacitor body to contact the edge of the one of the first and second internal electrodes.

3. The multilayer capacitor of claim 1, wherein the first and second internal electrodes further include a plurality of protrusions alternating disposed with grooves along the edge.

4. The multilayer capacitor of claim 1, further comprising:
dummy patterns respectively disposed in the grooves to be spaced apart from the one of the first and second internal electrodes.

5. The multilayer capacitor of claim 1, further comprising:
a side portion disposed on the capacitor body to contact the edge of the one of the first and second internal electrodes; and
dummy patterns respectively disposed in the grooves to be spaced apart from the one of the first and second internal electrodes and contacting the side portion.

6. The multilayer capacitor of claim 5, wherein the dummy patterns are in contact with one of the first and second side portions.

7. The multilayer capacitor of claim 3, wherein a width, in the length direction, of one of the grooves is greater than a width, in the length direction, of one of the protrusions.

8. The multilayer capacitor of claim 1, wherein an end of the edge of the one of the first and second internal electrodes is provided with a groove or a cutout recessed from a corner of the one of the first and second internal electrodes.

* * * * *